United States Patent
Vajravel et al.

(10) Patent No.: US 11,226,933 B2
(45) Date of Patent: Jan. 18, 2022

(54) ENHANCING WRITE FILTER FEATURES USING AN AUXILIARY OVERLAY

(71) Applicant: Dell Products L.P., Round Rock, TX (US)

(72) Inventors: Gokul Thiruchengode Vajravel, Bangalore (IN); Jyothi Bandakka, Bengaluru (IN); Ankit Kumar, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 84 days.

(21) Appl. No.: 16/700,440

(22) Filed: Dec. 2, 2019

(65) Prior Publication Data

US 2021/0165761 A1 Jun. 3, 2021

(51) Int. Cl.
*G06F 16/172* (2019.01)
*G06F 16/17* (2019.01)
*G06F 13/16* (2006.01)

(52) U.S. Cl.
CPC ........ *G06F 16/172* (2019.01); *G06F 13/1668* (2013.01); *G06F 16/1734* (2019.01)

(58) Field of Classification Search
CPC .............. G06F 16/172; G06F 13/1668; G06F 16/1734; G06F 21/50; G06F 21/51; G06F 21/52; G06F 21/554; G06F 21/60; G06F 21/6209; G06F 21/6281; G06F 21/6272; G06F 21/6218; G06F 21/6227; G06F 12/1416; G06F 3/062; G06F 3/0659
See application file for complete search history.

(56) References Cited

U.S. PATENT DOCUMENTS

| | | | | |
|---|---|---|---|---|
| 2005/0044548 A1* | 2/2005 | Page | ................. | G06F 8/63 718/100 |
| 2007/0186070 A1* | 8/2007 | Federa | ................. | G06F 12/1425 711/163 |
| 2012/0311263 A1* | 12/2012 | Kamath | ................. | G06F 3/0622 711/118 |
| 2013/0173744 A1* | 7/2013 | Xinglong | ................. | G06F 3/0617 709/217 |

(Continued)

OTHER PUBLICATIONS

"File-Based Write Filter", Documentation on Windows XP Embedded FBWF, Microsoft Docs, Published Oct. 7, 2008. (Year: 2008).*

Primary Examiner — David T. Brooks
(74) Attorney, Agent, or Firm — Kirton McConkie; Brian Tucker

(57) ABSTRACT

An overlay optimizer can enhance the functionality of a write filter using an auxiliary overlay. An overlay optimizer can be loaded above a write filter. Based on the configuration of the write filter's overlay, the overlay optimizer can be configured to implement a volatile or persistent auxiliary overlay and then use the auxiliary overlay to selectively cache artifacts. To minimize the likelihood that the consumption of the write filter's overlay will exceed a critical threshold, the overly optimizer can be provided a list of monitored artifacts. The overlay optimizer can employ the list to selectively move monitored artifacts from the write filter's overlay to the auxiliary overlay when the overlay's consumption reaches a threshold. The overlay optimizer may also selectively allow I/O requests generated by particular applications while redirecting I/O requests generated by other applications.

20 Claims, 13 Drawing Sheets

(56) References Cited

U.S. PATENT DOCUMENTS

| | | | |
|---|---|---|---|
| 2018/0217940 A1* | 8/2018 | Joshi | G06F 21/78 |
| 2018/0217946 A1* | 8/2018 | Joshi | G06F 12/1433 |
| 2018/0217996 A1* | 8/2018 | Joshi | G06F 16/1774 |
| 2018/0225058 A1* | 8/2018 | Kaushik | G06F 3/0617 |
| 2019/0339901 A1* | 11/2019 | Ou-Yang | G06F 3/0604 |
| 2019/0340083 A1* | 11/2019 | Ou-Yang | G06F 11/1469 |

* cited by examiner

ENHANCING WRITE FILTER FEATURES USING AN AUXILIARY OVERLAY

CROSS-REFERENCE TO RELATED APPLICATIONS

N/A

BACKGROUND

Operating systems, such as Windows, provide functionality for preventing the content of a storage medium from being changed. In a typical example, it may be desirable to prevent the operating system image, which may be stored on a particular disk partition or on flash media, from being changed at runtime. For example, Windows 10 provides the Unified Write Filter (UWF) which can be used to redirect all writes that target the operating system image to a RAM or disk cache called an overlay. This overlay stores changes made to the operating system at runtime but is removed when the user device is restarted thereby restoring the user device to its original state.

FIG. 1A illustrates how a write filter 110a can be employed to prevent the contents of a protected volume on disk 100 from being modified. Disk 100 is intended to generally represent any type of physical storage medium (or volume). In accordance with the Windows architecture, a driver stack consisting of file system driver 111, volume manager 112, and disk driver 113 sit atop disk 100, and I/O manager 120 manages the flow of I/O requests through the driver stack. An application can employ file/directory management APIs 160 to invoke a service of system services 130 (e.g., by calling ReadFile, WriteFile, CreateFile, etc. on a particular file) which will result in I/O manager 120 creating an IRP for the request. This IRP will then be passed down through the driver stack.

As depicted in FIG. 1, write filter 110a is positioned at the top of the driver stack and will therefore be able to process an IRP prior to the IRP being passed down to the lower level drivers. Write filter 110a can be configured to detect writes targeting a protected volume and redirect (or reparse) them to overlay 140 rather than allowing them to be passed down the driver stack unchanged. Accordingly, the driver stack can be referred to as a protected volume stack.

As represented by the dashed line, when write filter 110a detects a write to the protected volume, it will cause the content to be written in overlay 140 rather than to disk 100. Write filter 110a can be further configured to detect reads that target content that was previously redirected to overlay 140 and redirect these reads to overlay 140. In this way, even though it will appear to the application that the content of disk 100 is being updated, the updates are actually being temporarily maintained in overlay 140. The contents of overlay 140 can be maintained until the operating system is restarted or until an explicit command is received to discard the contents of the overlay.

Write filter 110a is an example of a file-system filter driver (e.g., uwf.sys). However, in Windows implementations, the write filter will also include a registry filter driver (e.g., uwfreg.sys) so that the write filter can also prevent the content of the registry from being modified. FIG. 1B represents this architecture. As shown, write filter 110b is registered with configuration manager 120a as a registry filter driver. Therefore, when applications use registry management APIs 160a to perform registry operations, configuration manager 120a will pass the registry operations to write filter 110b to allow it to handle the registry operations before they are completed. As with write filter 110a, write filter 110b can redirect registry operations to overlay 140 to prevent the content (or in the case, the registry hives 101) on the protected volume from being modified. Given that write filter 110a and write filter 110b function in the same general manner, in the remainder of the specification, a general reference to write filter 110 will be used and may be construed as encompassing only write filter 110a in some embodiments (e.g., when write filter 110 is used on user devices running non-Windows operating systems) and both write filter 110a and 110b in other embodiments (e.g., when write filter 110 is used on user devices running Windows operating systems).

As mentioned above, write filter 110 can be configured so that the contents of overlay 140 are discarded at reboot. In other words, overlay 140 may be a volatile overlay. However, in some cases, if may be desirable to maintain the content of overlay 140 across reboots—i.e., to make overlay 140 persistent. For this reason, certain versions of write filter 110 (e.g., the UWF available for Windows 10 RS4) enable an administrator to configure overlay 140 to be either volatile or persistent.

Various issues exist when overlay 140 is volatile as well as when it is persistent. For example, in both cases, the consumption of overlay 140 may reach a critical threshold (e.g., 90%) at which point write filter 110 will block further writes to overlay 140 (i.e., writes that would cause consumption to exceed the critical threshold) and will typically force a reboot. If overlay 140 is volatile, the content of overlay 140 will be discarded including any critical files that may be stored therein such as updates to the operating system, antivirus updates, system configurations, etc.

In contrast, if overlay 140 is persistent, the content of overlay 140 will not be discarded and, as a result, after reboot the consumption of overlay 140 will quickly or immediately exceed the critical threshold. This may cause indefinite reboots. In this scenario, an administrator will need to manually discard overlay 140 by disabling write filter 110 and resetting the cache. However, given that the persistent overlay is already "full," even after a reboot, another reboot may be initiated before the administrator even has the opportunity to disable write filter 110. For this reason, when employing a persistent overlay, the administrator must typically identify files/folders that are consuming a large portion of overlay 140 and exclude them from write filter protection so that during a subsequent reboot, the administrator will have sufficient time to disable the write filter. However, even in this scenario, the disabling of write filter 110, along with the resulting discarding of overlay 140, defeats the purpose of employing a persistent overlay. In particular, a persistent overlay is typically intended to preserve updates to certain files, but these updates will still be discarded as if a volatile overlay had been used.

Versions of write filter 110 provide a feature called Hibernate Once, Resume Many (HORM). When this feature is enabled, a hibernation file (e.g., hiberfil.sys) is created to define a preconfigured state for the system and then this hibernation file is used at each subsequent reboot to resume the system in the preconfigured state.

To employ the HORM feature, write filter 110 must be configured with various limitations. For example, write filter 110 must protect all volumes that are mounted on the system. Because of this limitation, the HORM feature is not available on Unified Extensible Firmware Interface (UEFI) user devices unless they are running the latest version of the Windows operating system since prior versions of Windows employed an installation procedure for UEFI that created a hidden system partition (i.e., a volume that UWF could not protect). This limitation also prevents HORM from being used on systems that need to exclude a volume from write filter 110's protection (e.g., systems that employ an overlay optimizer to enhance the functionality of write filter 110).

Additionally, when the HORM feature is used, there must not be any file, folder or registry exclusions configured with write filter 110. However, to properly function, some applications, such as antivirus software, management agents, setup services, browsers, etc., need to register exclusions so that their writes will be maintained across reboots. Therefore, when the HORM feature is enabled, such applications cannot be used, or at a minimum, the performance of such applications will suffer.

The inability to register exclusions also causes the consumption of overlay 140 to reach the critical threshold more quickly. In particular, when files, folders, registry entries, etc. are excluded, writes to these excluded artifacts will be directed to disk rather than to overlay 140 and will therefore not consume overlay 140. Enabling the HORM feature forces these writes to be made to overlay 140 which may lead to the indefinite reboot problem described above.

BRIEF SUMMARY

The present invention extends to methods, systems and computer program products for enhancing the functionality and features of a write filter using an auxiliary overlay. An overlay optimizer can be loaded above a write filter to allow the overlay optimizer to handle I/O requests before they are handled by the write filter. Based on the configuration of the write filter's overlay, the overlay optimizer can be configured to implement a volatile or persistent auxiliary overlay and then use the auxiliary overlay to selectively cache artifacts.

To minimize the likelihood that the consumption of the write filter's overlay will exceed a critical threshold, the overly optimizer can be provided a list of monitored artifacts. The overlay optimizer can employ the list to selectively move monitored artifacts from the write filter's overlay to the auxiliary overlay when the overlay's consumption reaches a threshold. When the overlay is volatile, these monitored artifacts may be important artifacts. In contrast, when the overlay is persistent, these monitored artifacts may be trivial artifacts.

The overlay optimizer can be used to provide a HORM-like experience without needing to enable the write filter's HORM feature. The overlay optimizer can provide this HORM-like experience by selectively allowing I/O requests generated by particular applications while redirecting I/O requests generated by other applications. In this way, the state of the particular applications can be preserved across reboots.

In some embodiments, the present invention is implemented by an overlay optimizer as a method for enhancing functionality of a write filter by employing an auxiliary overlay. The overlay optimizer can receive a list of monitored artifacts. The overlay optimizer can also detect that consumption of an overlay of the write filter has exceeded a threshold. In response to the detection, the overlay optimizer determines that one or more of the monitored artifacts is cached in the overlay and then moves the one or more monitored artifacts from the overlay to the auxiliary overlay.

In some embodiments, the present invention is implemented by an overlay optimizer as a method for enhancing functionality of a write filter by employing an auxiliary overlay. The overlay optimizer can receive a list of excluded applications. The overlay optimizer can then receive a first I/O request, detect that the first I/O request was originated by an application included in the list of excluded applications and allow the first I/O request to be passed to the write filter. The overlay optimizer can also receive a second I/O request, detect that the second I/O request was originated by an application not included in the list of excluded applications and redirect the second I/O request to the auxiliary overlay.

In some embodiments, the present invention is implemented as computer storage media storing computer executable instructions which when executed on a user device that includes a write filter implement an overlay optimizer that employs an auxiliary overlay to enhance functionality of the write filter. In response to detecting that an overlay of the write filter is persistent, the overlay optimizer selectively causes artifacts to be stored in an auxiliary overlay. Then, the overlay optimizer discards the auxiliary overlay as part of a subsequent reboot.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "user device" should be construed as any computing device that is capable of executing a write filter. A user device would therefore include desktops, laptops, tablets, thin clients, smart phones, etc. The term "write filter" should be construed as encompassing any driver or other component that functions as a filter to prevent content of a protected volume from being modified. The term "overlay optimizer" will be used to refer to one or more drivers, services and/or other components that are executed on a user device while a write filter is also executed and which employ an auxiliary overlay to enhance the write filter's functionality. The term "auxiliary overlay" should be construed as any type and/or number of data structures, whether maintained in memory, on disk or otherwise, that an overlay optimizer may employ to implement the functionality described herein. The term "artifact"

should be construed as encompassing files, registry entries or any other type of content that a write filter may store in an overlay.

Figure 1A:
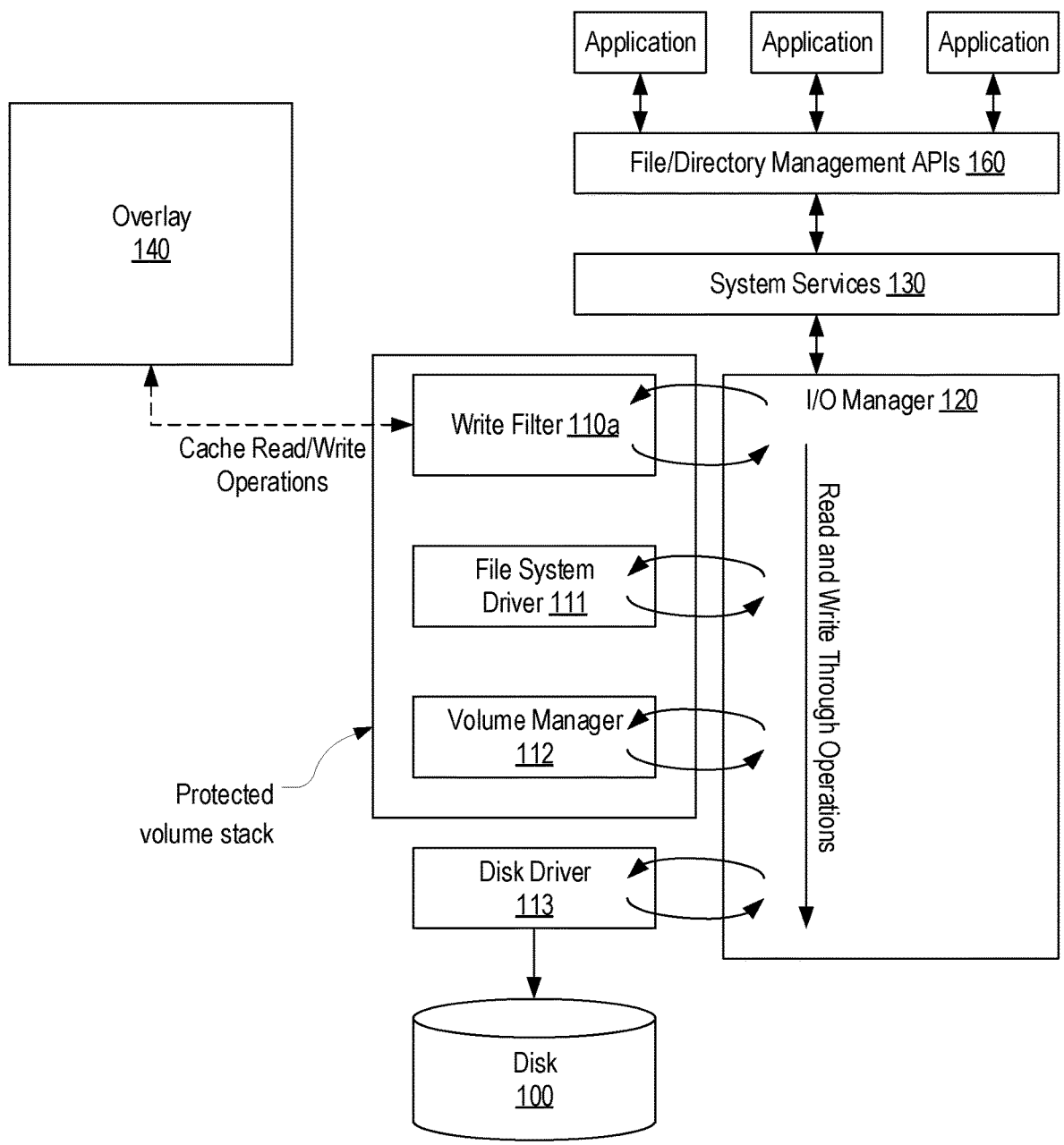
FIGS. 1A and 1B illustrate a Windows-based I/O system architecture in which a write filter is employed to prevent the content of a protected volume from being modified.
Figure 1B:
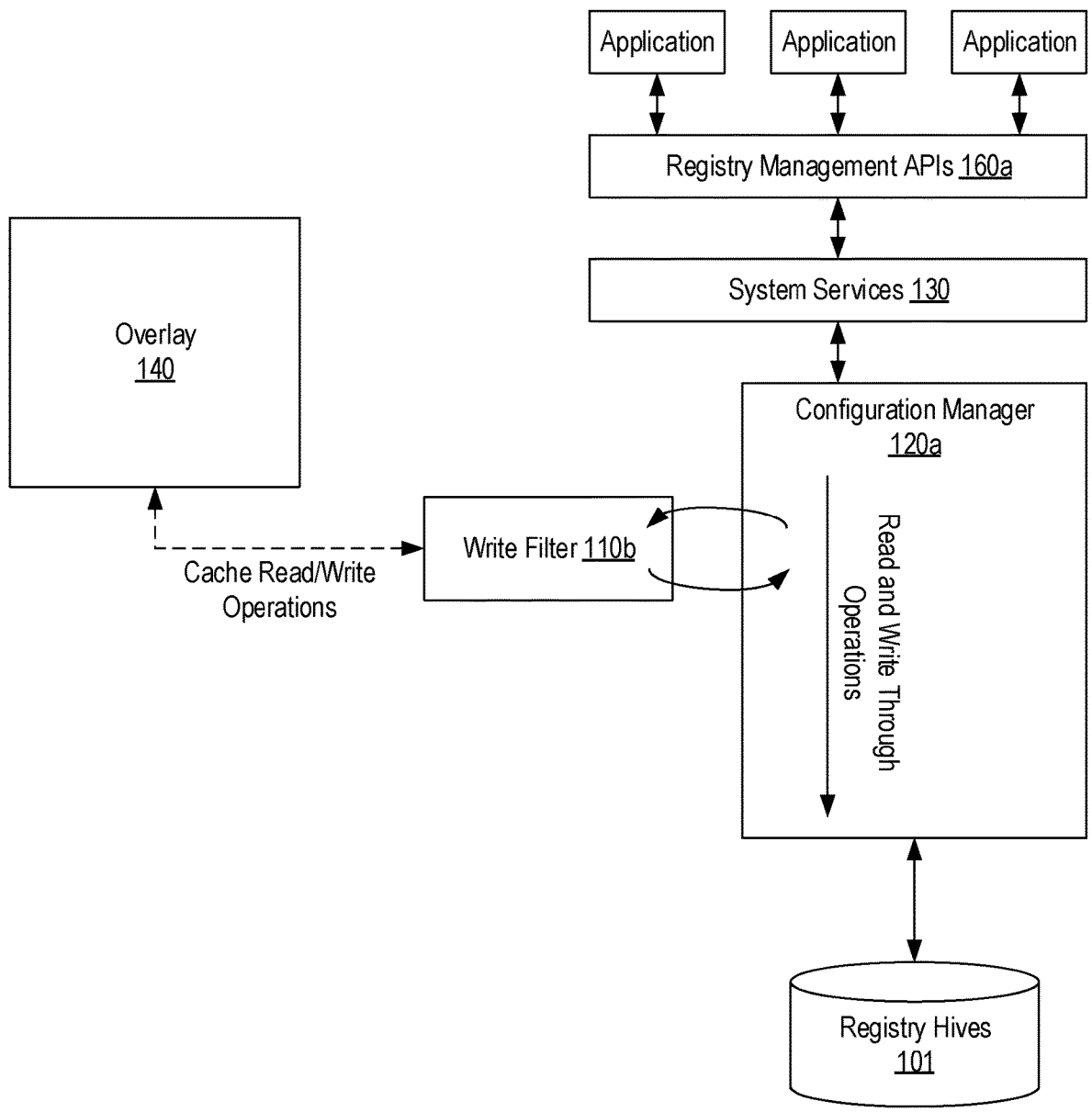
Figure 2A:
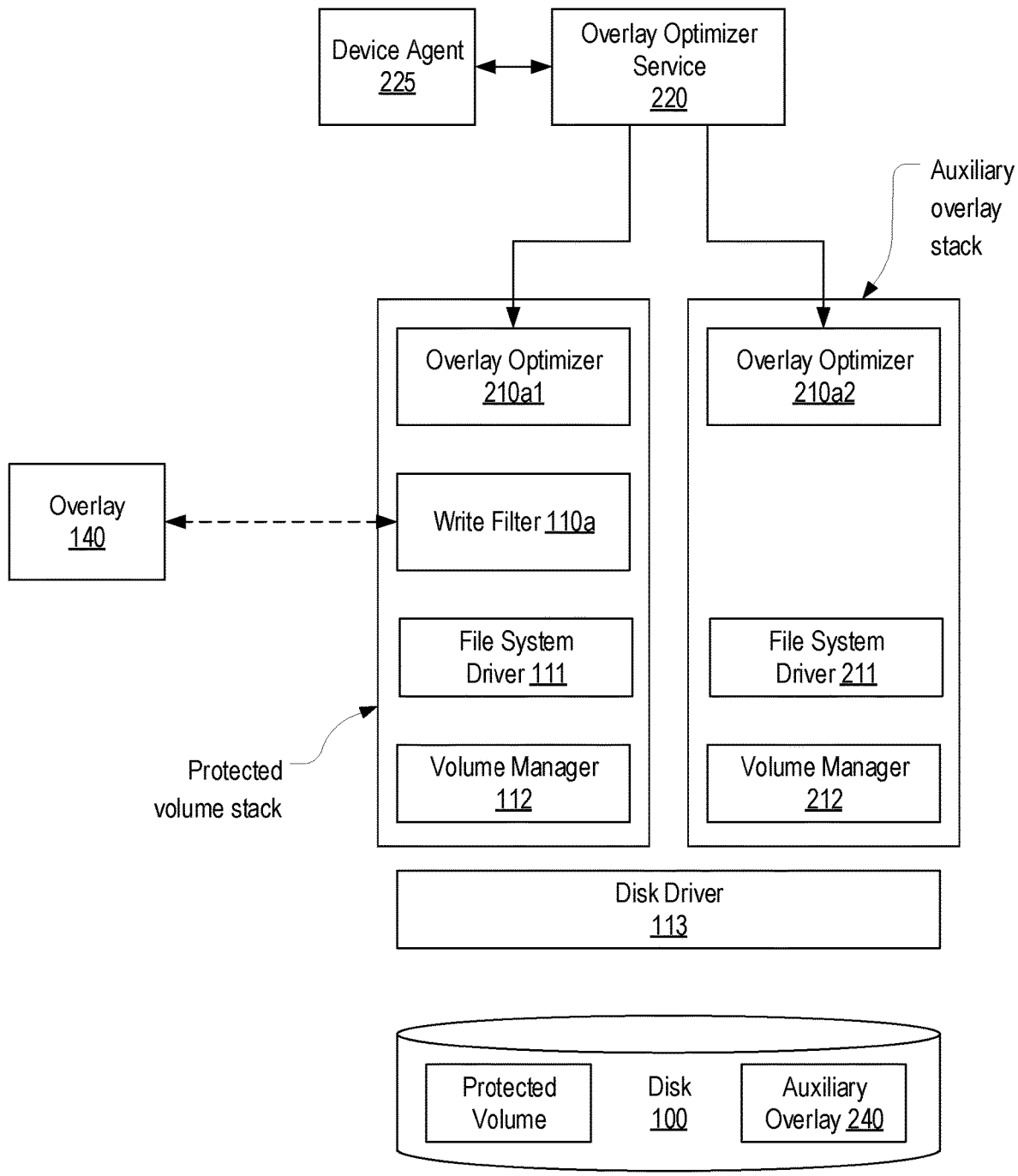
FIGS. 2A and 2B illustrate how an overlay optimizer can use an auxiliary overlay to enhance features and/or functionality of a write filter.

FIG. 2A, which corresponds with FIG. 1A, illustrates how overlay optimizers 210a1 and 210a2, which are in the form of file system filter (or minifilter) drivers, can be employed on a user device that includes write filter 110a. Similarly, FIG. 2B, which corresponds with FIG. 1B, illustrates how an overlay optimizer 210b, which is in the form of a registry filter driver, can be employed on a user device that includes write filter 210b (and that also likely includes write filter 110a and overlay optimizers 210a1 and 210a2). In the remainder of the specification, a general reference to overlay optimizer 210 may be used and may be construed as encompassing only overlay optimizers 210a1 and 210a2 in some embodiments (e.g., when overlay optimizer 210 is used on user devices running non-Windows operating systems) and each of overlay optimizers 210a1, 210a2 and 210b in other embodiments (e.g., when overlay optimizer 210 is used on user devices running Windows operating systems). Also, at least some of the functionality described herein can be performed without using overlay optimizer 210a2. Therefore, references to overlay optimizer 210 may be construed as encompassing only overlay optimizer 210a1 in some embodiments and only overlay optimizers 210a1 and 210b in other embodiments.

Overlay optimizer 210 can maintain an auxiliary overlay 240 that it employs to provide a number of enhancements to the features and functionality of write filter 110 including to address at least some of the shortcomings described in the background. Overlay optimizer 210 could be configured to implement auxiliary overlay 240 as a separate volume (or partition) on disk 100 (which is represented in FIG. 2A), in memory (e.g., as a RAM disk) or in some other suitable manner. In any case, when overlay optimizer 210 is implemented, a first file system filter driver—overlay optimizer 210a1—can be loaded on the protected volume stack above write filter 110a, and a second file system filter driver—overlay optimizer 210a2—may be loaded on an auxiliary overlay stack. As shown, this auxiliary overlay stack can be the volume stack pertaining to the separate volume/partition of disk 100 on which auxiliary overlay 240 is implemented and does not include write filter 110a. Notably, if auxiliary overlay 240 were implemented as a RAM disk, a similar auxiliary overlay stack would be created and overlay optimizer 210a2 could be loaded on that stack. As mentioned above, however, overlay optimizer 210a2 need not be loaded to perform at least some of the functionality described herein.

Figure 2B:
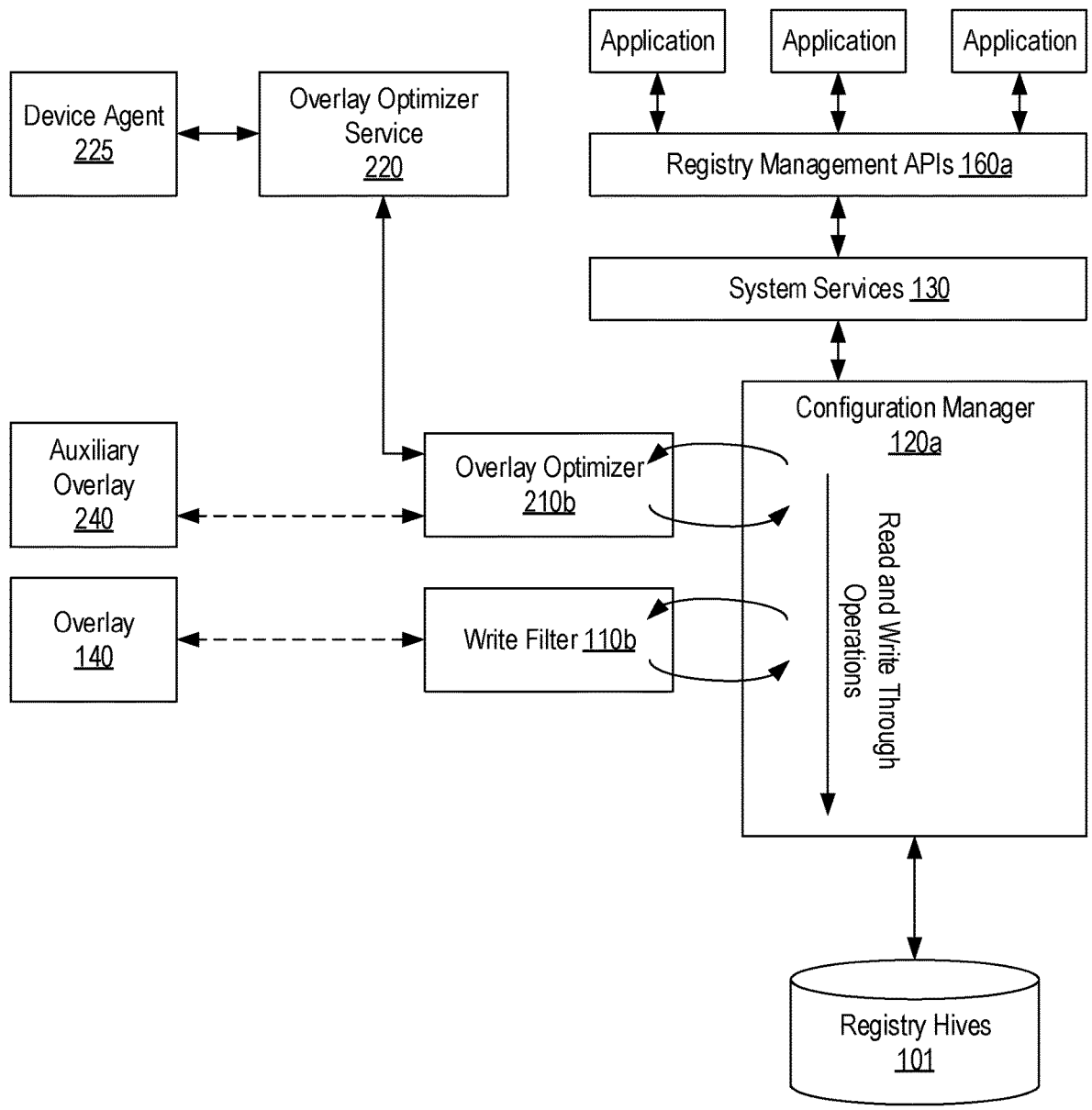

As shown in FIG. 2B, overlay optimizer 210b can be registered with configuration manager 120a with an altitude high enough to cause configuration manager 120a to pass registry operations to overlay optimizer 210b before passing them to write filter 110b (e.g., greater than 384910). For simplicity, auxiliary overlay 240 is depicted in FIG. 2B as a box. However, it is to be understood that the auxiliary overlays depicted in FIGS. 2A and 2B would typically be the same.

In some embodiments, to assist overlay optimizer 210 in providing enhancements to the features and functionality of write filter 110, an overlay optimizer service 220 and/or device agent 225 may also be executed on the user device. As described further below, overlay optimizer service 220 may primarily function to communicate with overlay optimizer 210 at runtime, while device agent 225 may primarily function to enable an administrator, who may be remote to the user device, to configure overlay optimizer 210.

Figure 3A:
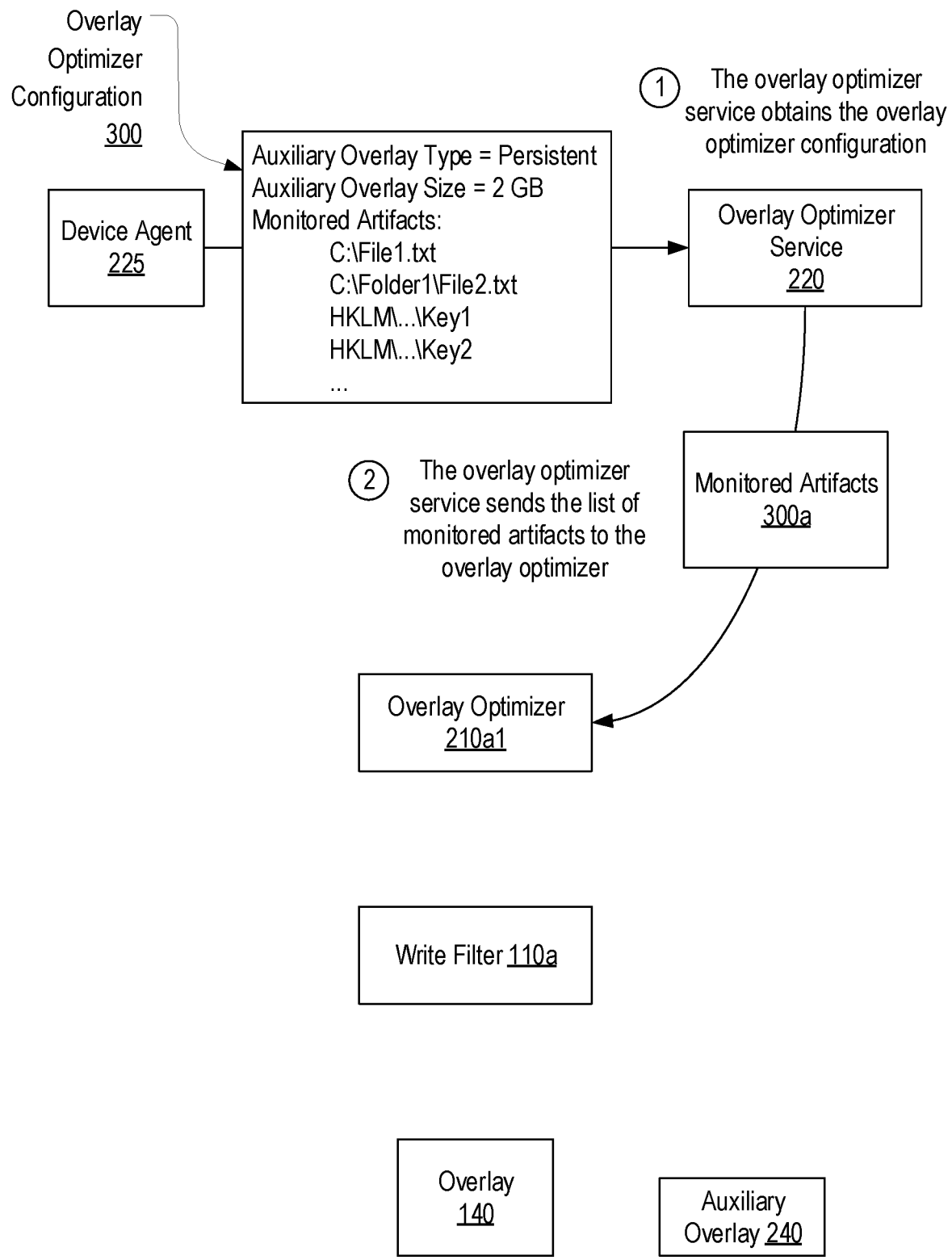
FIGS. 3A-3D illustrate how an overlay optimizer can selectively move artifacts from a write filter's volatile overlay to a persistent auxiliary overlay.
Figure 3B:
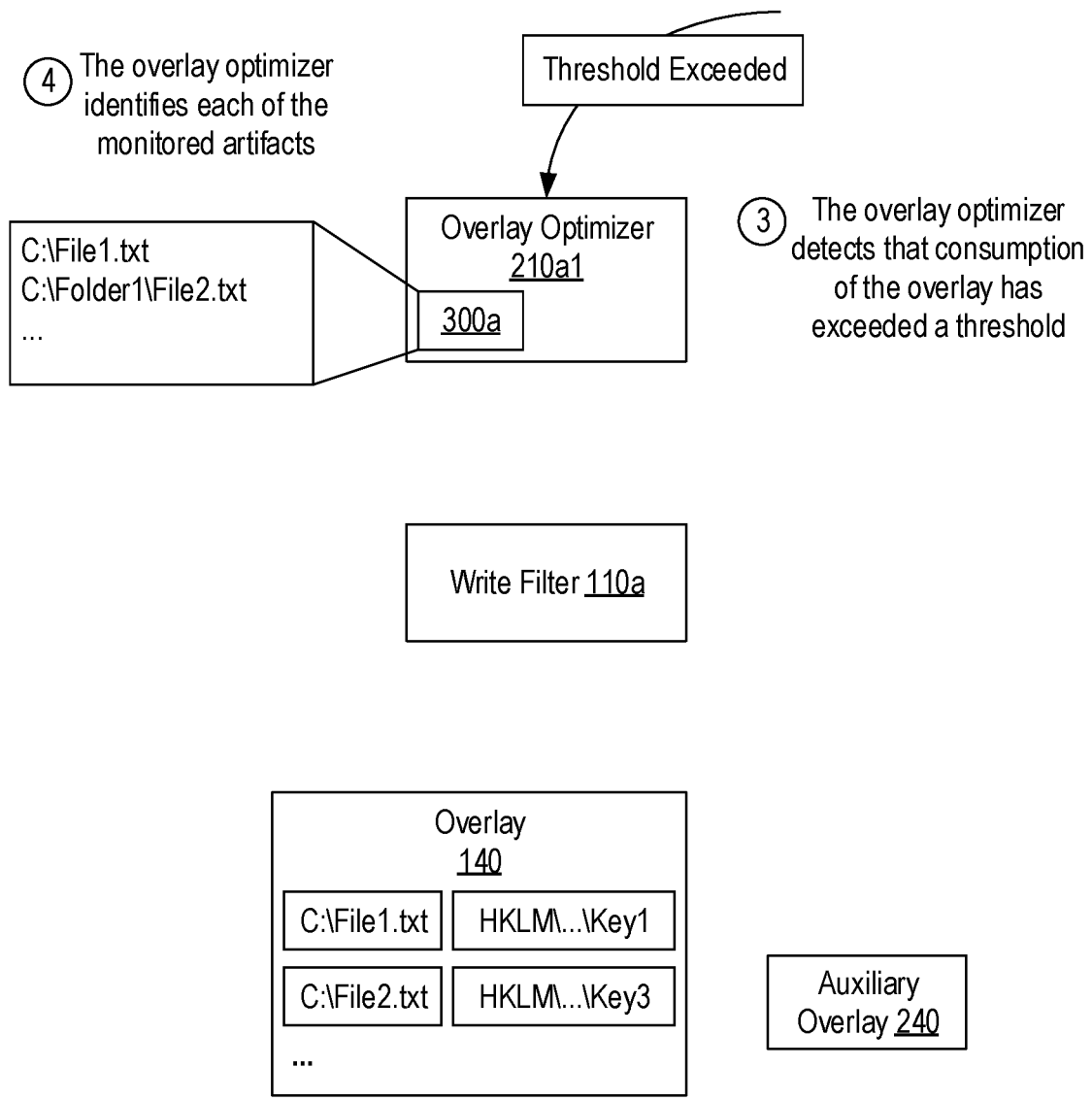
Figure 3C:
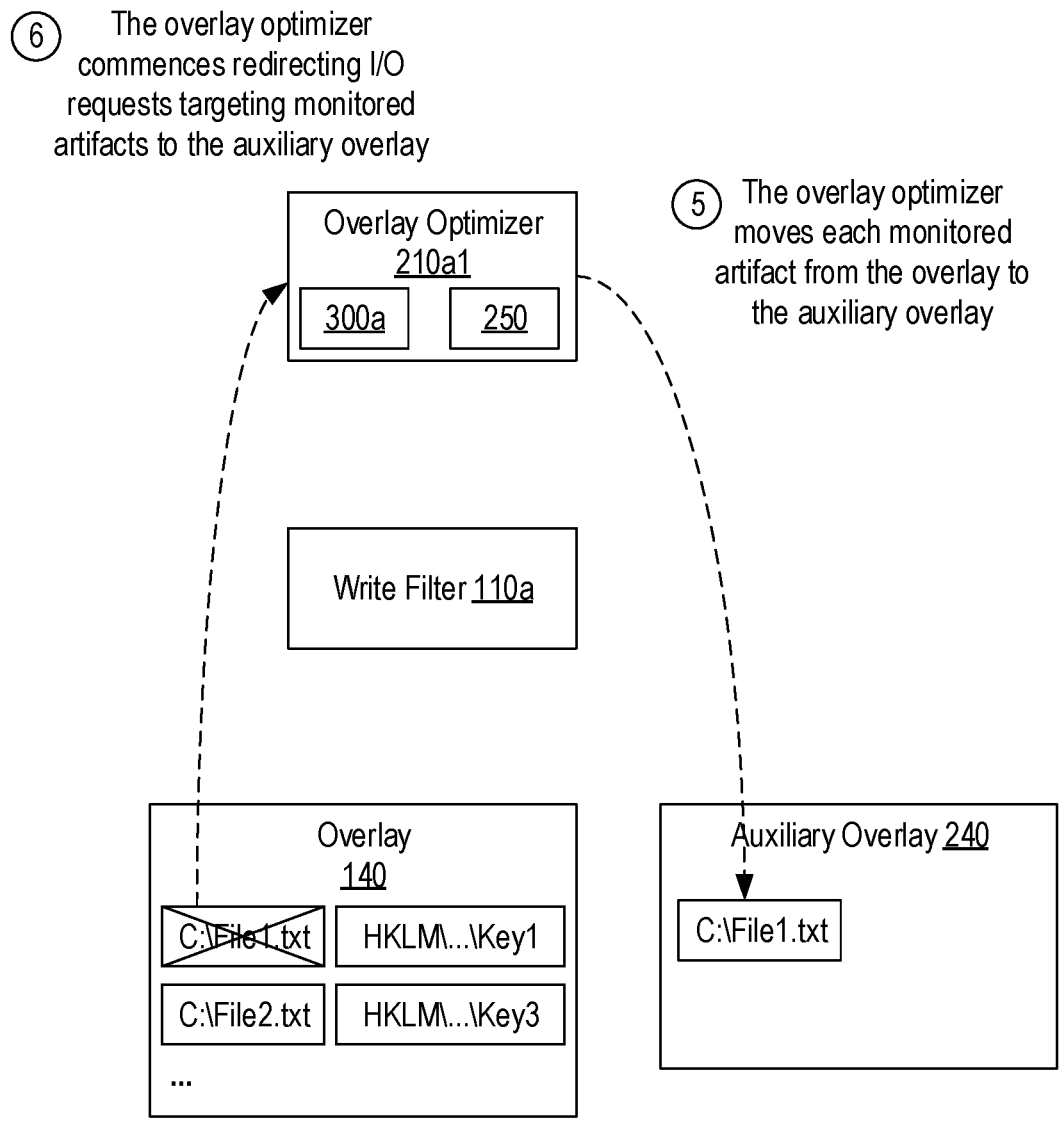
Figure 3D:
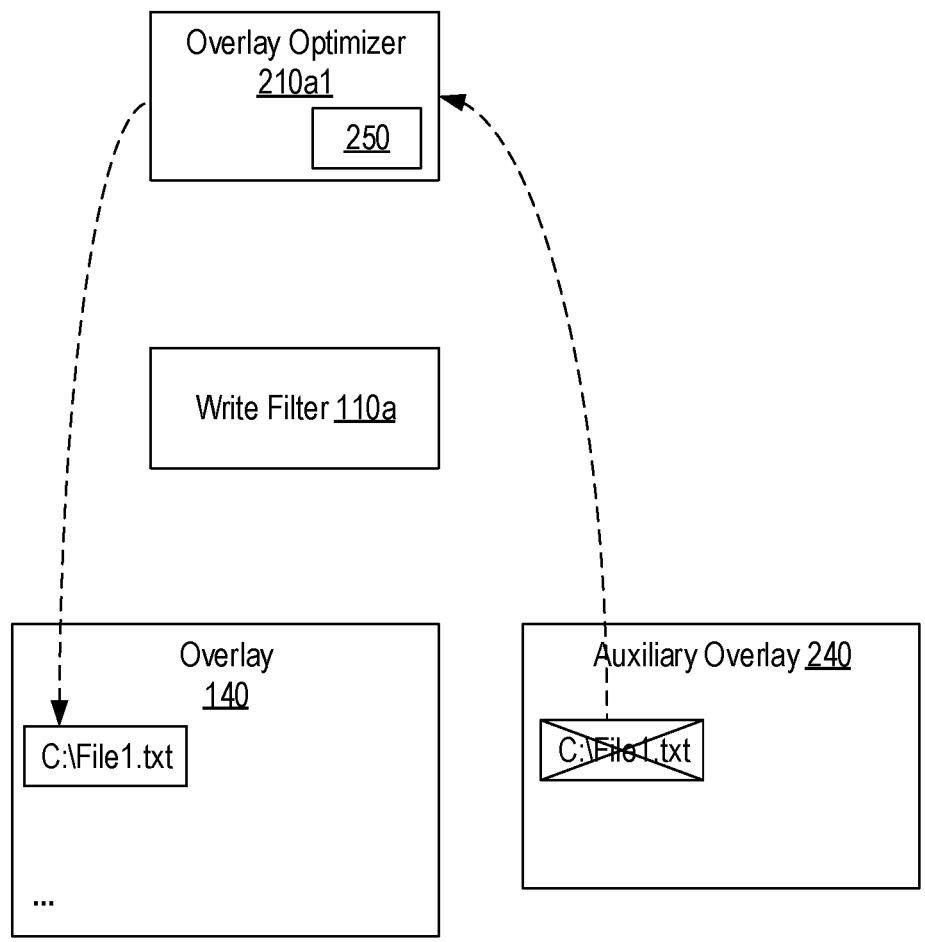

FIGS. 3A-3C illustrate an example of how overlay optimizer 210 can selectively move artifacts from volatile overlay 140 to persistent auxiliary overlay 240 to ensure that the artifacts are persisted across reboots. These figures depict this functionality being performed in the environment shown in FIG. 2A to enhance write filter 110a but many of the components, including overlay optimizer 210a2, have been omitted to simplify the illustration. Although not shown, parallel functionality could be performed in the environment shown in FIG. 2B to also enhance write filter 110b.

Turning to FIG. 3A, it is assumed that an overlay optimizer configuration 300 has been defined. For example, an administrator could employ device agent 225 to define whether auxiliary overlay 240 should be persistent or volatile, to specify the size of auxiliary overlay 240 and/or to list artifacts that should be monitored. In some embodiments, the administrator could configure auxiliary overlay 240 to be persistent when overlay 140 is volatile. In other embodiments, device agent 225 could automatically detect when overlay 140 is volatile and automatically define auxiliary overlay 240 as persistent in overlay optimizer configuration 300. The artifacts listed in overlay optimizer configuration 300 may typically be files and/or registry entries that are routinely updated to ensure proper performance of an application/system such as virus signature files, Windows update files, system management files, etc. However, an administrator could list any artifact for which updates should be persisted across reboots. It is noted that this list of monitored artifacts is distinct from the exclusion list that write filter 110 maintains.

With overlay optimizer configuration 300 defined and as part of system startup, overlay optimizer service 220 can obtain overlay optimizer configuration 300 in step 1 and then send the list of monitored artifacts 300a to overlay optimizer 210 in step 2. For example, once overlay optimizer service 220 is loaded at startup, it could detect that write filter 110 is enabled and, if so, obtain and send monitored artifacts 300a to overlay optimizer 210 (or 210a1 and 210b) as part of instructing overlay optimizer 210 to commence filtering I/O requests or registry operations.

Although not shown, in some embodiments such as described below, overlay optimizer service 220 can determine whether overlay optimizer configuration 300 indicates that auxiliary overlay 240 should be volatile and, if so, format the partition where auxiliary overlay 240 is implemented to thereby remove any artifacts that may have been previously stored in auxiliary overlay 240. In contrast, if overlay optimizer configuration 300 indicates that auxiliary overlay 240 should be persistent, overlay optimizer service 220 will forego formatting this partition so that the artifacts that were previously stored therein will remain available for reasons described below.

Turning to FIG. 3B, it is assumed that the system has been running and write filter 110 has caused artifacts to be stored in overlay 140. Then, in step 3, overlay optimizer 210 detects that consumption of overlay 140 has reached a threshold (e.g., 40%). Overlay optimizer 210 could make this detection in any suitable manner. For example, overlay optimizer service 220 could be configured to periodically query write filter 110 for its consumption (e.g., by reading the OverlayConsumption property of the overlay's WMI object) and to notify overlay optimizer 210 when the consumption exceeds the threshold. In response to detecting that the consumption of overlay 140 has reached the threshold, overlay optimizer 210 can then identify the relevant artifacts in the list of monitored artifacts 300a in step 4. For example, overlay optimizer 210a1, which could have stored the list of monitored artifacts 300a in step 2, could identify each monitored file. Similarly, overlay optimizer 210b could identify each monitored registry entry.

Then, as represented as step 5 in FIG. 3C, overlay optimizer 210 can move each monitored artifact from overlay 140 to auxiliary overlay 240. For example, overlay optimizer 210a1 could issue appropriate I/O requests to cause the content of C:\File1.txt to be read from overlay 140 and written to auxiliary overlay 240. Similarly, overlay optimizer 210b could issue appropriate registry operations to cause HKLM\ . . . \Key1 to be read from overlay 140 and written to auxiliary overlay 240. After step 5, overlay optimizer 210 will have caused each of the monitored files that may have been cached in overlay 140 to be moved to auxiliary overlay 240 thereby freeing up space in overlay 140. Furthermore, each of the monitored files will now be stored in persistent auxiliary overlay 240 where they will be maintained across reboots rather than being discarded from volatile overlay 140 at reboot.

With the monitored artifacts moved to auxiliary overlay 240, overlay optimizer 210 can commence redirecting I/O requests and/or registry operations that target the monitored artifacts to auxiliary overlay 240. To accomplish this, overlay optimizer 210 may maintain a map 250 which links each monitored artifact's location on the protected volume to its location in auxiliary overlay 240. With map 250, overlay optimizer 210 can determine how to reparse an I/O request to target the modified monitored artifact in auxiliary overlay 240 rather than the original monitored artifact that still exists on the protected volume.

Finally, in some embodiments, at the next reboot, overlay optimizer 210 can move each monitored artifact from auxiliary overlay 240 back to overlay 140 in step 7. Overlay optimizer 210 may again employ map 250, which could have been persisted in auxiliary overlay 240, for this purpose. This will ensure that the modifications that were made to the monitored artifacts prior to the reboot will be maintained while freeing overlay 210 from needing to continue redirecting I/O requests targeting the monitored artifacts. As mentioned above, overlay optimizer service 220 will forego formatting the partition on which auxiliary overlay 240 is maintained when overlay optimizer configuration 300 indicates that auxiliary overlay 240 should be persistent. As a result, the modified monitored artifacts that overlay optimizer 210 had moved to auxiliary overlay 240 prior to the reboot will still be stored therein. In contrast, if, prior to reboot, the administrator had updated overlay optimizer configuration 300 to indicate that auxiliary overlay 240 should be volatile, overlay optimizer service 220 will have caused the modified monitored artifacts to be discarded such that the original monitored files on the protected volume will be used going forward.

To summarize, this selective moving of monitored artifacts from overlay 140 to auxiliary overlay 240 ensures that modifications to the monitored artifacts will not be lost if/when the consumption of volatile overlay 140 exceeds the critical threshold and forces a reboot or if/when the content of volatile overlay 140 is otherwise discarded. This selective moving enables modifications to artifacts to be persisted even when overlay 140 is volatile but without excluding the artifacts from write filter 110's protection (i.e., the original version of the monitored files will remain unchanged on the protected volume while modifications are persisted across reboots). Accordingly, an administrator can persist modifications without all the difficulties that come with using a persistent overlay while also maintaining the original state of the protected volume.

Figure 4A:
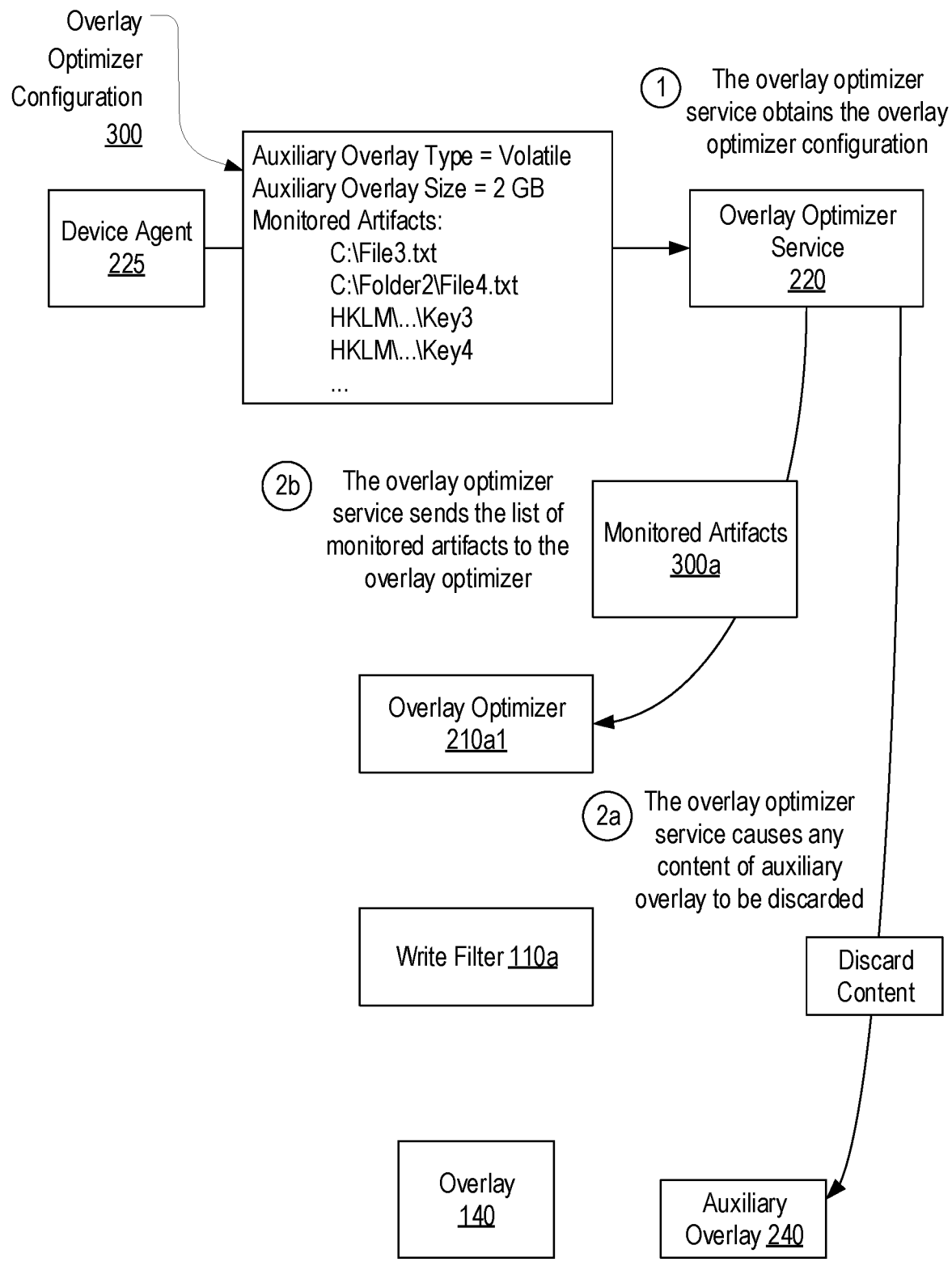
FIGS. 4A-4C illustrate how an overlay optimizer can selectively move artifacts from a write filter's persistent overlay to a volatile auxiliary overlay.
Figure 4B:
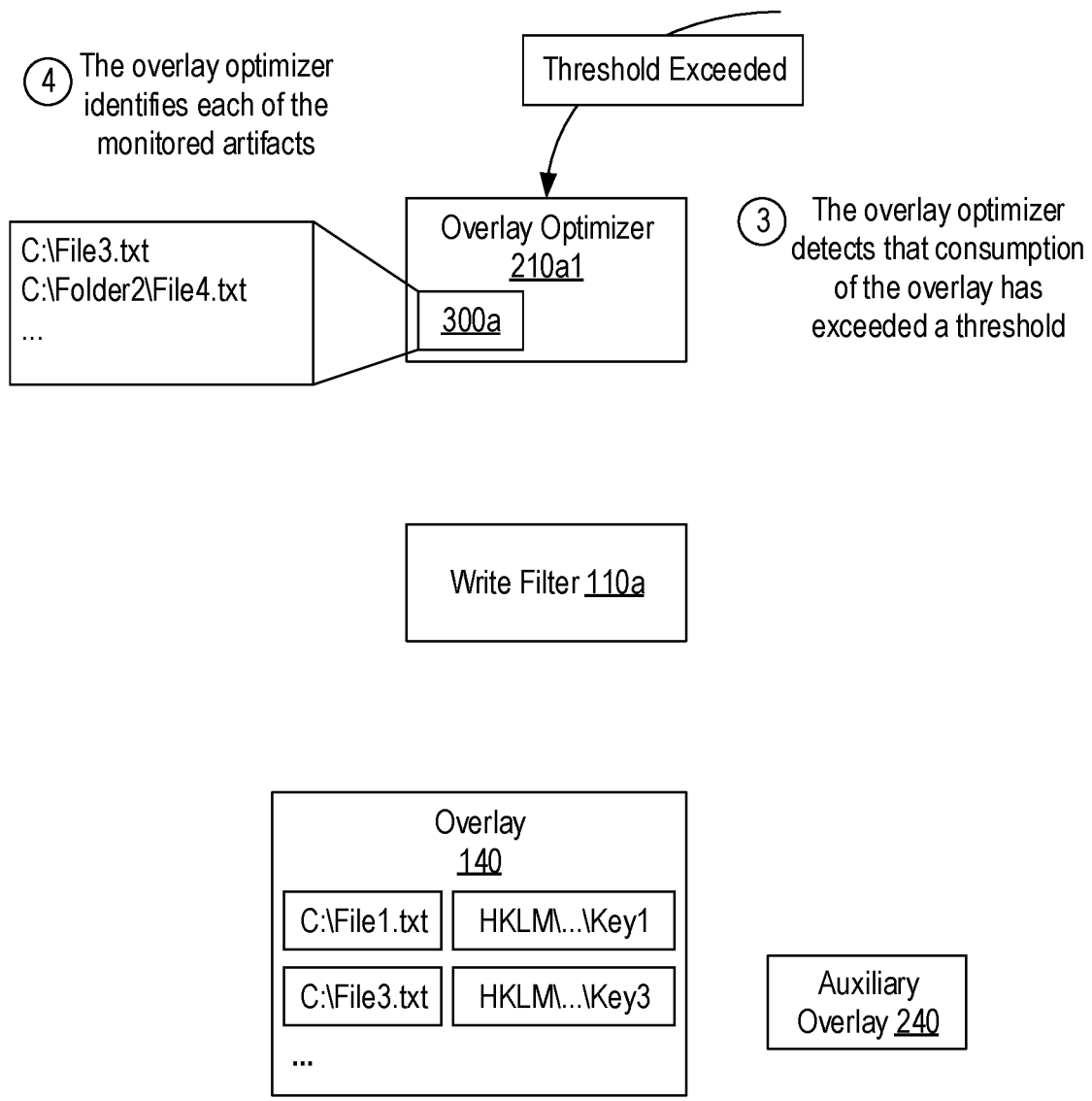
Figure 4C:
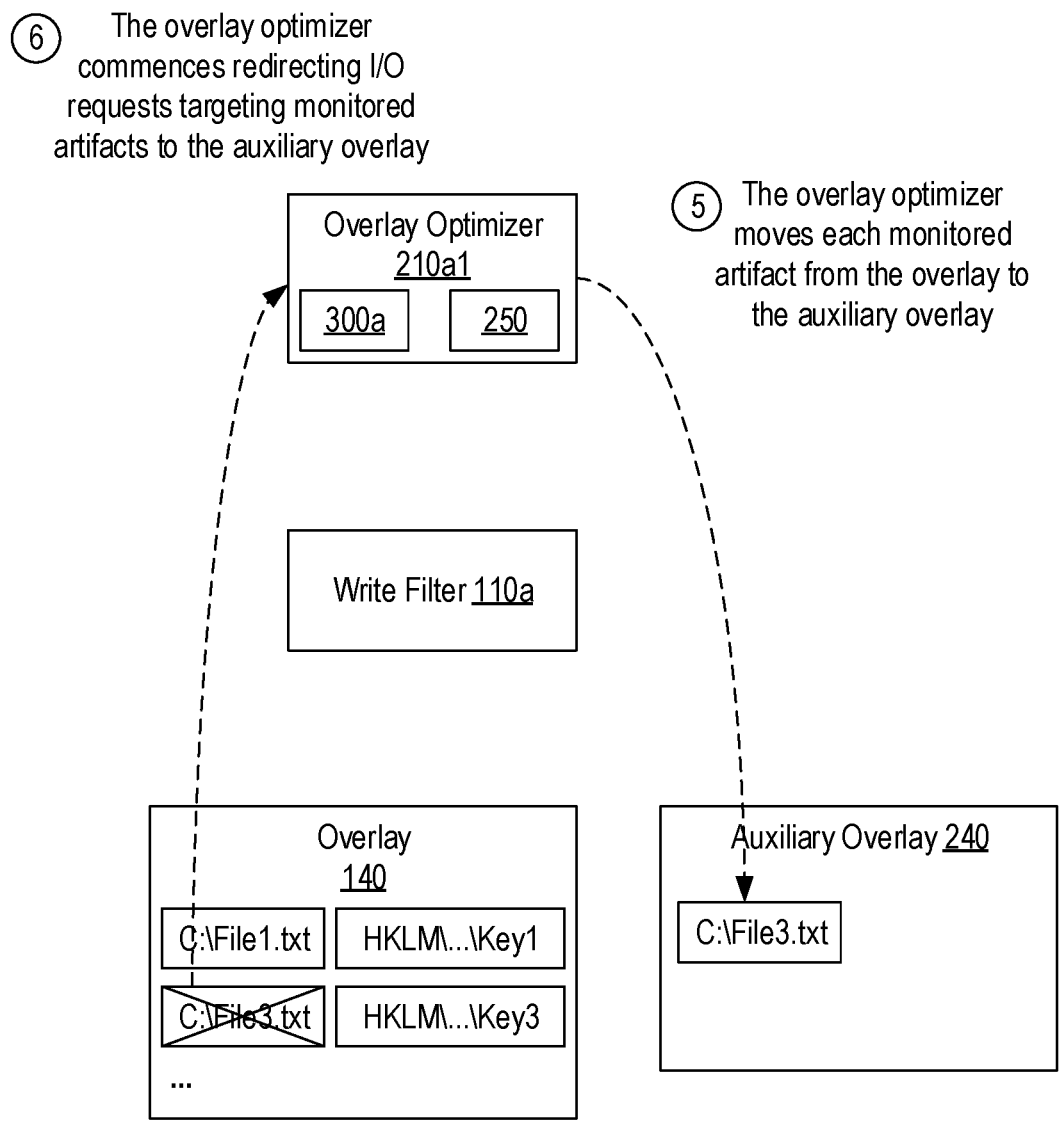

FIGS. 4A-4C illustrate an example of how overlay optimizer 210 can selectively move artifacts from persistent overlay 140 to auxiliary overlay 240 to prevent the consumption of overlay 140 from exceeding the critical threshold and therefore to minimize the likelihood that the system will go into continuous reboots. The process depicted in FIGS. 4A-4C is similar to the process depicted in FIGS. 3A-3D with a few exceptions as described below.

As shown in FIG. 4A, because overlay 140 is persistent, overlay optimizer configuration 300 can indicate that auxiliary overlay 240 should be volatile. Overlay optimizer configuration 300 can also identify monitored artifacts. However, in this scenario, the monitored artifacts will typically be trivial files such as temporary files for a browser or a virtual desktop infrastructure (VDI) application, but any artifact could be included in the list.

In step 2a, overlay optimizer service 220 can discard any artifacts that may currently exist in auxiliary overlay 240 (e.g., artifacts that were moved to auxiliary overlay 240 prior to reboot). As described above, overlay optimizer service 220 could accomplish this by formatting the partition on which auxiliary overlay 240 is implemented, but other techniques for discarding the content of auxiliary overlay 240 could also be used. In step 2b, overlay optimizer service 220 sends the list of monitored artifacts 300a to overlay optimizer 210 and is therefore similar to step 2 of FIG. 3A.

FIG. 4B is similar to FIG. 3B and illustrates that, in these embodiments, overlay optimizer 210 can also detect when the consumption of overlay 140 has reached a threshold (which may or may not be the same threshold as described above) in step 3, and then in step 4 identify each relevant monitored artifact. FIG. 4C is similar to FIG. 3C and illustrates that, in these embodiments, overlay optimizer 210 can also move each monitored artifact that may be stored in overlay 140 to auxiliary overlay 240 in step 5, and may then commence redirecting I/O requests that target the monitored artifacts in step 6.

At this point, overlay optimizer 210 will have moved each monitored artifact from overlay 140 to auxiliary overlay 240 thereby freeing up space in overlay 140. Additionally, although not shown in the figures, an administrator may manually move non-monitored artifacts (i.e., artifacts that were not included in the list of monitored artifacts 300a) to further free up overlay 140 if necessary. For example, the administrator could use device agent 250 and/or overlay optimizer service 220 to send instructions to overlay optimizer 210 to move specific artifacts. In response to such instructions, overlay optimizer 210 could perform steps 5 and 6.

Because of this processing, it will be less likely that the consumption of persistent overlay 140 will exceed the critical threshold. This is particularly true considering that the trivial files that may be identified as monitored files in this scenario are oftentimes among the largest files that may be stored in overlay 140. Also, because overlay optimizer service 220 will discard the content of auxiliary overlay 240 at the next reboot (e.g., by again performing step 2a), overlay optimizer 210 will not move monitored files back to overlay 140 (e.g., overlay optimizer 210 will not perform step 7 when auxiliary overlay 240 is defined as volatile) which further minimizes the likelihood that the system will go into continuous reboots. At the same time, overlay optimizer 210 will not have moved any non-monitored artifacts from overlay 140 (unless instructed to do so manually), and therefore, the non-monitored artifacts, which will typically include files having updates that are important to maintain, will remain in persistent overlay 140 and will therefore be persisted across reboots. Accordingly, an administrator can employ a persistent overlay 140 without needing to constantly monitor consumption to avoid continuous reboots.

Figure 5A:
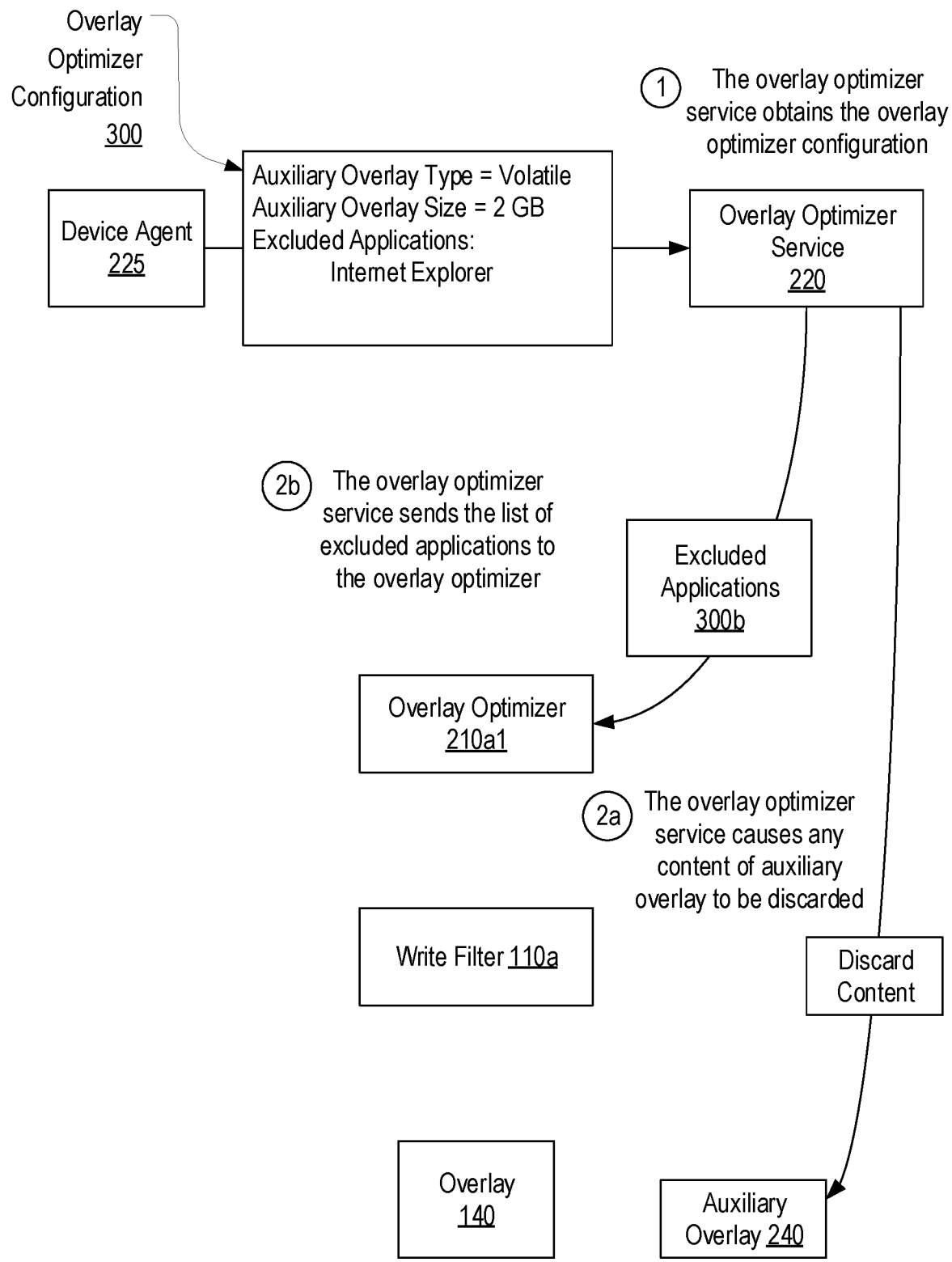
FIGS. 5A and 5B illustrate how an overlay optimizer can selectively allow I/O requests originated by an excluded application while redirecting I/O requests originated by other applications to an auxiliary overlay.
Figure 5B:
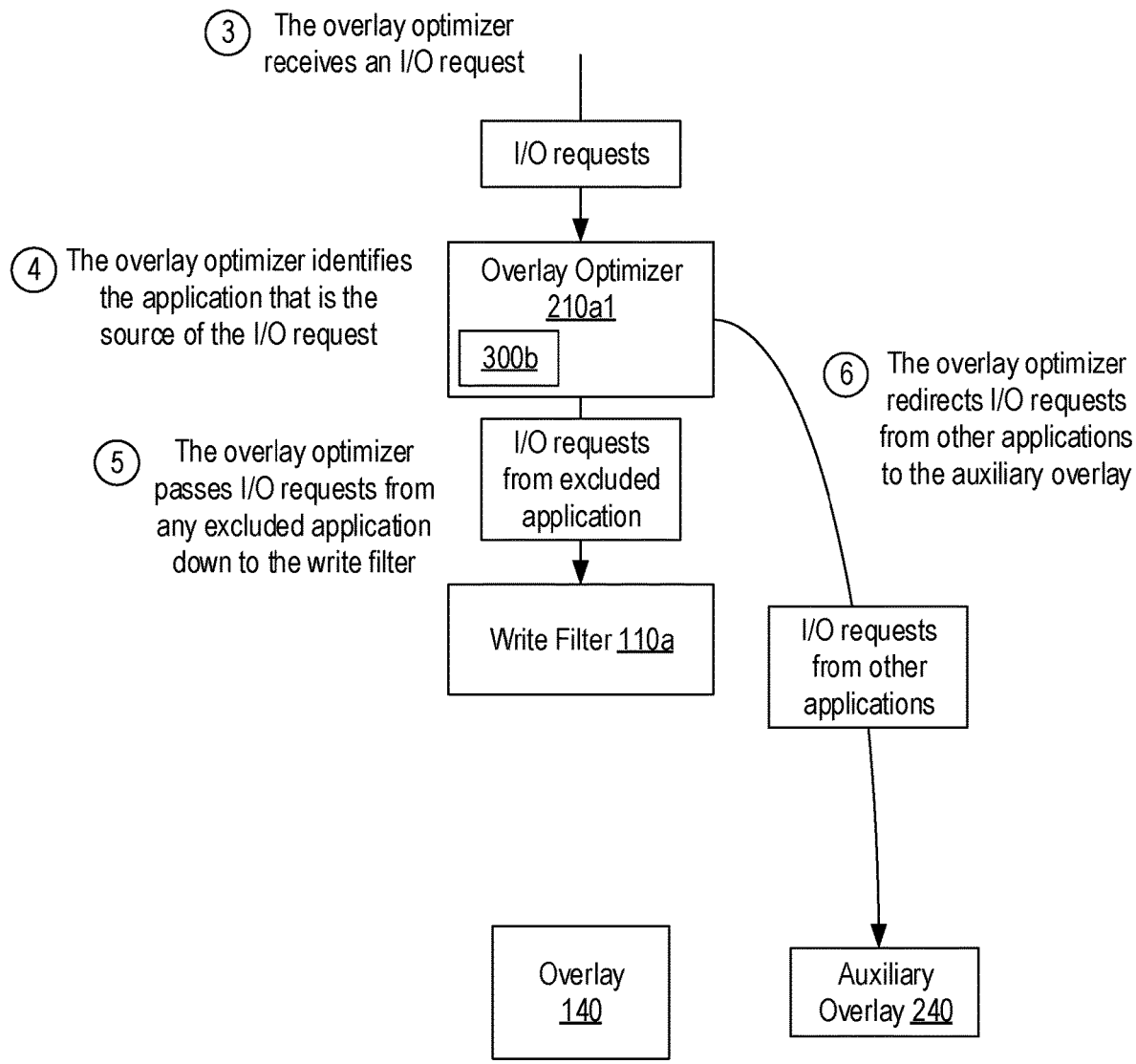

In embodiments where overlay 140 is persistent, overlay optimizer 210 can be configured to perform a similar process to preserve the state of a particular application. FIGS. 5A-5C illustrate an example of how this can be accomplished.

FIG. 5A is similar to FIG. 4A except that overlay optimizer configuration 300 includes a list of excluded applications rather than a list of monitored artifacts. In this example, it will be assumed that Internet Explorer is the only excluded application but more than one application could be excluded. As shown, steps 1, 2a and 2b are similar to those described above except that in step 2b, overlay optimizer service 220 sends the list of excluded applications 300b to overlay optimizer 210.

Turning to FIG. 5B, once overlay optimizer 210 has been notified of the excluded application(s), it can commence filtering I/O requests. In particular, in step 3, overlay optimizer 210 receives an I/O request (or registry operation). Then, in step 4, as part of its handling of the I/O request, overlay optimizer 210 can identify the application that is the source of the I/O request. For example, overlay optimizer 210a1 can register a preoperation callback function for IRP_MJ_CREATE I/O requests and overlay optimizer 210b can register a RegistryCallback routine for pre-notification of various types of registry operations. Then, as part of its pre-operation handling of a particular I/O request, overlay optimizer 210 could obtain a process identifier of the current process (e.g., by calling the PsGetCurrentProcess and PsGetProcessId functions) and then use the process identifier to retrieve the name of the application that caused the I/O request to be created (e.g., by opening a handle to the process and using the handle as input to the GetProcessImageFileName function).

If overlay optimizer 210 determines that an excluded application is the source of an I/O request, in step 5, overlay optimizer 210 can pass the I/O request down to write filter 110. As a result, write filter 110 will handle the I/O request is a typical manner. Accordingly, any modifications made by an excluded application will be cached in persistent overlay 140.

In contrast, if overlay optimizer 210 determines that the source of the I/O request is not an excluded application, in step 6, overlay optimizer 210 will redirect (or reparse) the I/O request to auxiliary overlay 240 (unless it is a read of an artifact that has not been cached in auxiliary overlay 240 in which case it can be passed down to write filter 110 to cause the unmodified artifact to be read from the protected volume). As a result, any modifications made by a non-excluded application will be cached in volatile auxiliary overlay 240 rather than in persistent overlay 140.

At reboot, overlay optimizer service 220 will cause the content of auxiliary overlay 240 to be discarded. In contrast, the content of overlay 140 will be persisted. In this way, the state of any excluded application can be preserved across reboots.

In some embodiments, this functionality of overlay optimizer 210 can be leveraged to create a HORM-like experience without the limitations and difficulties of actually enabling the HORM feature of write filter 110. For example, by configuring overlay optimizer 210 to implement application exclusions, each time the system reboots, the state of any excluded application will be preserved as if HORM had been enabled. Notably, this state preservation is accomplished without requiring write filter 110 to protect all volumes and without losing the ability to add exclusions to write filter 110's protection. Furthermore, because overlay optimizer 210 will redirect I/O requests originated by non-excluded applications to auxiliary overlay 240, it will be far less likely that the consumption of overlay 140 will exceed the critical threshold resulting in fewer (e.g., less frequent) reboots.

Similarly, by configuring overlay optimizer 210 to implement the selective moving of monitored artifacts from persistent overlay 140 to volatile overlay 240, it will be far less likely that the consumption of overlay 140 will exceed the critical threshold. Yet, the non-monitored artifacts will be persisted in overlay 140 thereby preserving the state of applications to which the non-monitored artifacts pertain. This is accomplished while retaining the ability to define exclusions with write filter 110. Furthermore, overlay optimizer 210 can provide this HORM-like functionality on any operating system that employs a write filter, whereas the write filter's HORM feature is only supported by some operating systems.

In conclusion, an overlay optimizer can be employed to enhance the features and functionality of a write filter in situations where the write filter uses a volatile overlay and in situations where the write filter uses a persistent overlay. The overlay optimizer can provide these enhancements while still allowing the write filter to be used to protect the content of a volume.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media includes signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by an overlay optimizer, for enhancing functionality of a write filter by employing an auxiliary overlay, the method comprising:
    receiving a list of artifacts that should be monitored, the list of artifacts being defined by an administrator to include artifacts for which updates should be persisted across reboots;
    detecting that consumption of an overlay of the write filter has exceeded a threshold;
    in response to the detection, accessing the overlay to identify artifacts that are cached in the overlay;
    determining that one or more of the artifacts in the list of artifacts is cached in the overlay; and
    moving the one or more artifacts from the overlay to the auxiliary overlay to thereby ensure that the one or more artifacts are persisted across reboots.

2. The method of claim 1, further comprising:
    in conjunction with a subsequent reboot, removing the one or more artifacts from the auxiliary overlay.

3. The method of claim 2, wherein the overlay is persistent and wherein removing the one or more artifacts from the auxiliary overlay comprises formatting a partition on which the auxiliary overlay is implemented.

4. The method of claim 2, wherein the overlay is volatile, and wherein removing the one or more artifacts from the auxiliary overlay comprises moving the one or more artifacts to the overlay.

5. The method of claim 1, wherein the overlay optimizer comprises a file system filter driver that is loaded above the write filter and a service that sends the list of artifacts to the file system filter driver to enable the file system filter driver to move the one or more artifacts from the overlay to the auxiliary overlay.

6. The method of claim 5, further comprising:
    detecting, by the service, that the auxiliary overlay is volatile; and
    removing the one or more artifacts from the auxiliary overlay.

7. The method of claim 1, wherein the overlay optimizer comprises a registry filter driver that is loaded above the write filter and a service that sends the list of artifacts to the registry filter driver to enable the registry filter driver to move the one or more artifacts from the overlay to the auxiliary overlay.

8. The method of claim 1, further comprising:
    receiving a list of excluded applications;
    receiving a first I/O request;
    detecting that the first I/O request was originated by an application included in the list of excluded applications; and
    allowing the first I/O request to be passed to the write filter.

9. The method of claim 8, further comprising:
    receiving a second I/O request;
    detecting that the second I/O request was originated by an application not included in the list of excluded applications; and
    redirecting the second I/O request to the auxiliary overlay.

10. The method of claim 9, further comprising:
    discarding the auxiliary overlay.

11. A method, implemented by an overlay optimizer, for enhancing functionality of a write filter by employing an auxiliary overlay, the method comprising:
    receiving a list of excluded applications;
    receiving a first I/O request that attempts to modify a first artifact stored on a protected volume;
    detecting that the first I/O request was originated by an application included in the list of excluded applications;
    allowing the first I/O request to be passed to the write filter to thereby cause the write filter to cache the modification to the first artifact in an overlay of the write filter;
    receiving a second I/O request that attempts to modify a second artifact stored on the protected volume;
    detecting that the second I/O request was originated by an application not included in the list of excluded applications; and
    redirecting the second I/O request to the auxiliary overlay to thereby cause the modification to the second artifact to be cached in the auxiliary overlay.

12. The method of claim 11, further comprising:
    discarding the auxiliary overlay.

13. The method of claim 12, wherein the overlay optimizer comprises a file system filter driver that is loaded above the write filter and a service that sends the list of excluded applications to the file system filter driver.

14. The method of claim 13, wherein the service discards the auxiliary overlay by formatting a partition on which the auxiliary overlay is implemented.

15. The method of claim 11, wherein the overlay optimizer comprises a registry filter driver that is loaded above the write filter and a service that sends the list of excluded applications to the registry filter driver, and wherein the first and second I/O requests are registry operations.

16. The method of claim 11, further comprising:
    receiving a list of monitored artifacts;
    detecting that consumption of an overlay of the write filter has exceeded a threshold;
    in response to the detection, determining that one or more of the monitored artifacts is cached in the overlay; and
    moving the one or more monitored artifacts from the overlay to the auxiliary overlay.

17. The method of claim 16, further comprising:
    discarding the auxiliary overlay during a subsequent reboot.

18. One or more computer storage media storing computer executable instructions which when executed on a user device that includes a write filter implement an overlay optimizer that employs an auxiliary overlay to enhance functionality of the write filter by performing the following:

in response to detecting that an overlay of the write filter is configured to be maintained across the reboots of the user device, selectively causing artifacts to be stored in an auxiliary overlay; and discarding the auxiliary overlay as part of a subsequent reboot.

19. The computer storage media of claim 18, wherein selectively causing artifacts to be stored in an auxiliary overlay comprises one or more of:

moving monitored artifacts from an overlay of the write filter to the auxiliary overlay upon detecting that consumption of the overlay has reached a threshold; or redirecting I/O requests to the auxiliary overlay upon detecting that the I/O requests were originated by a non-excluded application.

20. The computer storage media of claim 18, wherein the artifacts include files and registry entries.

* * * * *